United States Patent [19]

Carlton

[11] Patent Number: 5,689,921

[45] Date of Patent: Nov. 25, 1997

[54] FOOTING CONNECTOR AND METHOD OF USE

[76] Inventor: Douglas C. Carlton, 1115 Heatherwood, Flint, Mich. 48532

[21] Appl. No.: 526,750

[22] Filed: Sep. 11, 1995

Related U.S. Application Data

[63] Continuation-in-part of Ser. No. 216,150, Aug. 22, 1994, Pat. No. 5,560,163, which is a continuation of Ser. No. 198,515, Feb. 18, 1994.

[51] Int. Cl.$^6$ ..................................................... E04G 15/06
[52] U.S. Cl. .................. 52/169.5; 52/98; 52/220.8; 52/302.1; 285/901; 285/903
[58] Field of Search ............................. 285/901, 903; 52/302.1, 220.8, 169.5, 98; 454/903, 909, 342, 343

[56] References Cited

U.S. PATENT DOCUMENTS

| | | |
|---|---|---|
| 947,185 | 1/1910 | McBean . |
| 1,603,245 | 10/1926 | Penderson . |
| 1,864,861 | 6/1932 | Schaller . |
| 2,707,117 | 4/1955 | Fentress et al. . |
| 2,758,612 | 8/1956 | Zaleski . |
| 2,818,636 | 1/1958 | Fentress et al. . |
| 2,893,432 | 7/1959 | Bowditch . |
| 3,318,336 | 5/1967 | Treiber . |
| 3,486,771 | 12/1969 | Conlin . |
| 3,669,473 | 6/1972 | Martin et al. ............... 285/903 X |
| 3,695,643 | 10/1972 | Schmunk . |
| 3,727,953 | 4/1973 | Martin et al. . |
| 3,771,633 | 11/1973 | Ghirardi et al. ............ 285/903 X |
| 3,825,288 | 7/1974 | Maroschak ................. 285/903 X |
| 3,895,177 | 7/1975 | Muslin . |
| 3,897,090 | 7/1975 | Maroshak . |
| 4,071,265 | 1/1978 | Wallace . |
| 4,132,264 | 1/1979 | Furlong . |
| 4,274,455 | 6/1981 | Simons . |
| 4,279,190 | 7/1981 | Hummel . |
| 4,453,354 | 6/1984 | Harbeke . |
| 4,488,388 | 12/1984 | Schmidt . |
| 4,688,833 | 8/1987 | Todd . |
| 4,817,348 | 4/1989 | Wydra . |
| 4,915,020 | 4/1990 | Dumbeck .................... 454/909 X |
| 4,938,124 | 7/1990 | Garza ............................. 454/343 |
| 5,083,500 | 1/1992 | Francis et al. .............. 454/909 X |
| 5,104,150 | 4/1992 | Bard et al. ................... 285/901 X |
| 5,107,648 | 4/1992 | Roby . |
| 5,158,501 | 10/1992 | Proskiw ...................... 454/909 X |

*Primary Examiner*—Christopher T. Kent
*Attorney, Agent, or Firm*—Weintraub DuRoss & Brady

[57] ABSTRACT

A footing connector and a method for use thereof. The connector is preferably T-shaped and includes integrally formed end caps which may be used to prevent cement or the like from entering into the connector. The connector is used in a drainage network to drain water away form the outside of a building and to evacuate unwanted gasses from the inside of a building.

13 Claims, 2 Drawing Sheets

FOOTING CONNECTOR AND METHOD OF USE

CROSS REFERENCE TO RELATED APPLICATIONS

This application is a continuation-in-part application of U.S. patent application Ser. No. 08/216,150 ('150) entitled "DRAINAGE CONNECTOR AND DEVICE TO CONNECT TO DRAINAGE CONNECTOR" filed Mar. 22, 1994, now U.S. Pat. No. 5,560,163, which is, in turn, a continuation application of U.S. patent application Ser. No. 08/198,515 ('515), entitled "DRAINAGE CONDUIT", filed Feb. 18, 1994, the disclosures of both of the above-identified applications being incorporated herein by reference.

BACKGROUND OF THE INVENTION

1. Field of the Invention

The present invention relates to drainage conduit connectors for buildings. More particularly, the present invention concerns such conduit connectors and a method for utilizing such connectors.

2. Description of the Prior Art

As is known to those skilled in the art to which the present invention pertains, there are known methods and devices for draining moisture from the exterior of a building through the building footings to the interior of the building for removal by a sump pump or the like. One known method is to drill through the concrete after it has been poured and has hardened to provide an opening through which communication with the sump pump can be achieved. This method is not desirable because it is expensive in time and material, and particularly in wear on drilling tools.

The most commonly known method for installing a drainage system employs corrugated drainage conduits or drain tile which are positioned between footing forms (usually made of wood) prior to pouring cement. Typically the ends of the conduits are nailed about their periphery to the footing forms, and then concrete is poured thereover. This poses several problems. First, the conduit ends can be crushed by the nailing process and/or the weight of the concrete, thereby radially deforming and/or closing the drainage openings. Additionally, the corrugated conduit can be moved away from the form by the weight of the concrete, thereby allowing concrete to seep into the interior of the corrugated conduit, reducing its benefit.

Ordinarily, the drain conduit is interconnected through suitable connectors to elongated lengths of conduit which are disposed about the building. Because of the problems encountered with the pouring of the cement, this in turn, leads to problems with the connectors. For example, if concrete accumulates in the conduit it is difficult to attach a connector thereto. Concomitantly, if the conduit is deformed, then attachment is difficult, if not impossible.

Thus, in the above-referred to co-pending applications there is disclosed and taught a collar for use with footings which prevents the collapse and closure of the ends of the drain conduit. Additionally, there is taught a connector for interconnecting multiple drain conduits. While the inventions disclosed therein are efficacious, it is to be appreciated that there is no facility for preventing cement from entering the connectors or conduit at the outside of the form. Many times, as cement is being poured, it falls outside of the form and spills into the conduit, thereby preventing water from flowing therethrough.

While the connectors and conduit disclosed in the co-pending applications are used to drain water from the exterior of a building, it is also known to those skilled in the art that there are methods for removing unwanted gasses, such as radon, carbon monoxide, natural gas, etc. from inside a building. Such methods include manually opening windows, or manually operating fans in various rooms of a building to expel foul air to the outside thereof. These methods are generally ineffective for several reasons. First, occupants of a building may have already suffered physical damage due to exposure to such gasses by the time somebody opens a window or turns on a fan. Additionally, such efforts may involve much effort depending on the size of the building.

Currently utilized footing conduits are provided only for drainage of water from the outside of a building to the inside, where the water may be drained away by a drain, sump pump, or the like. Such conduits are not used to remove gasses from below the footing and within the building itself even though such gasses pose many health risks.

It is to the solution of the above-mentioned problems that the present invention is directed.

SUMMARY OF THE INVENTION

In accordance with a first aspect of the present invention there is provided a connector for use with a collar and tubing in forming a footing, the connector comprising:

(a) a first hollow leg, the leg having a thread formed thereon, the leg being threadably connectable to a collar; and (b) at least one end cap integrally formed on and contiguous with the first hollow leg, the end cap projecting outwardly from the hollow leg and being severable therefrom.

Generally, the connector includes a hollow leg of corrugated tubing, preferably formed from a hard plastic. At least one end cap, preferably disposed at each end of the leg, is integrally formed therewith.

Prior to placement of the connector, the caps may be removed from the leg. Removal of the caps may be accomplished by cutting, such as by sawing or the like, or other similarly well-known means. The caps fit into the open ends of the collar disclosed in the hereinabove referenced patent applications. When emplaced, the caps preclude entry of cement into the collars, tubing, and connectors at the outside of the form.

The connector may be "T"-shaped, "Y"-shaped, or cross-shaped depending upon its placement in the footing, and the configuration of the network to be formed. The connectors, collars, and corrugated tubing form a network that may function to drain water from about the periphery of the building and concomitantly evacuate unwanted gasses from within the building.

In accordance with a second aspect of the present invention there is provided a method for configuring the connectors, collars, and corrugated tubing hereof to provide a footing that serves both to drain condensation from the outside of a building to the inside of the building and to evacuate gasses from the inside of a building to the outside thereof.

For a more complete understanding of the present invention reference is made to the following detailed description and accompanying drawings. In the drawings, like reference characters refer to like parts throughout the several views, in which:

DETAILED DESCRIPTION OF THE PREFERRED EMBODIMENTS

Figure 1:
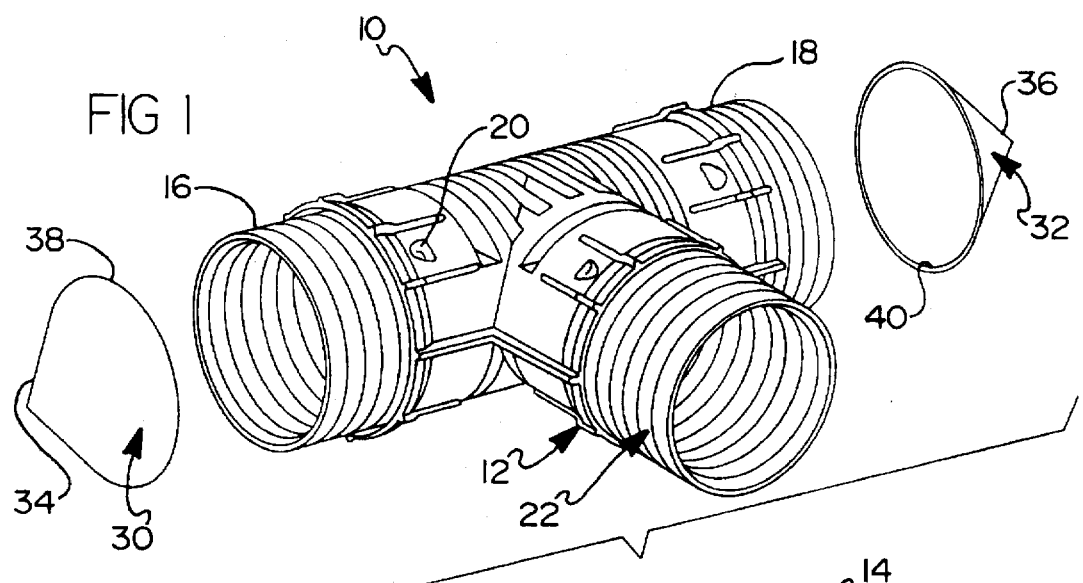
FIG. 1 is an exploded view of a preferred footing connector according to the present invention.
Figure 2:
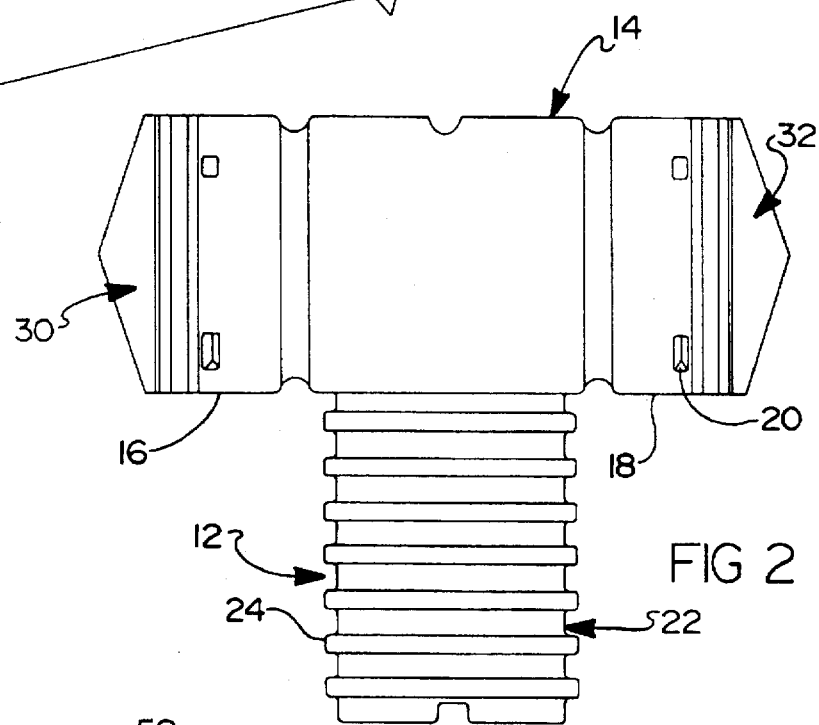
FIG. 2 is a plan view of the footing connector of FIG. 1.

FIGS. 1 and 2 depict the preferred embodiment of the connector 10. The connector 10 is, preferably, a "T"-connector, although other configurations can be used, such as a "Y"-connector or a cross-connector. As shown, the connector hereof comprises a first leg 12 which is substantially normal to a second leg 14 defined by arms 16, 18. The legs 12, 14 have hollow interiors to enable fluid communication therebetween. The legs 12, 14 have protruberances 20 formed therein to enable threaded engagement with a connecting section of conduit or a collar, as discussed further herein.

Preferably, the leg 12 has a threaded section 22 having an exterior thread 24 formed thereon to enable the connector to threadably engage the collar or tubing via the protuberances on the collar.

The arms 16, 18 of the second leg 14 each include an end cap 30, 32 integrally formed at the terminus thereof. The end caps 30, 32 may be removed by cutting such as with a knife, saw or the like in an apparent manner.

As depicted in FIG. 1, each end cap 30, 32 has a closed distal end 34, 36 and an open proximal end 38, 40. With the end caps 30, 32 removed, the arms 16, 18 of the second leg 14 join in any convenient manner to another connector, a collar, or to a length of tubing to enable formation of a routing network of channels to direct both moisture and gasses to a desired location, as disclosed in the co-pending applications. In any event, the connector 10 of the preferred embodiment utilizes first and second interconnecting legs 12, 14 in fluid communication therewith.

Figure 3:
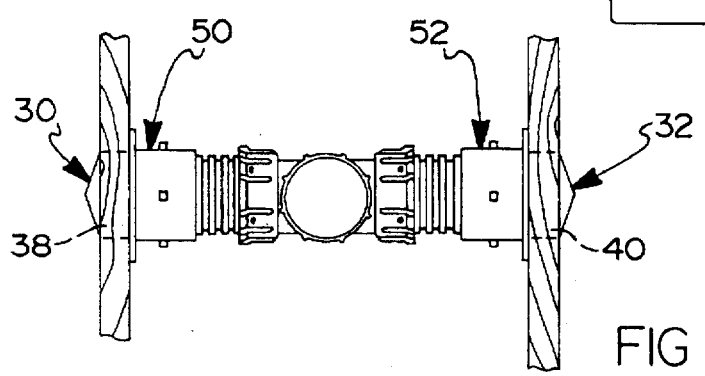
Fig. 3 is a top plan view of the footing connector of FIG. 1 in use with the end caps covering the collars leading to the outside of the form.

In use, and as depicted in FIG. 3, the end caps 30, 32 are configured to be employed with collars 50, 52 such as those disclosed in the applications included herein by reference ('150 & '515). The proximal end 38, 40 of each end cap 30, 32 engages the collars 50, 52. By placing the caps 30, 32 outside the footing form and inserting their proximal ends 38, 40 into corresponding collars, cement which might accidentally spill at the outside of the footing form is precluded from entering the interior of the collar and the connector. Additionally, the caps preclude cement from seeping between the collar and the footing form when the collar is mounted to the inside of the footing form, as taught in the co-pending applications. This ensures the operability of the drain network.

Figure 4:
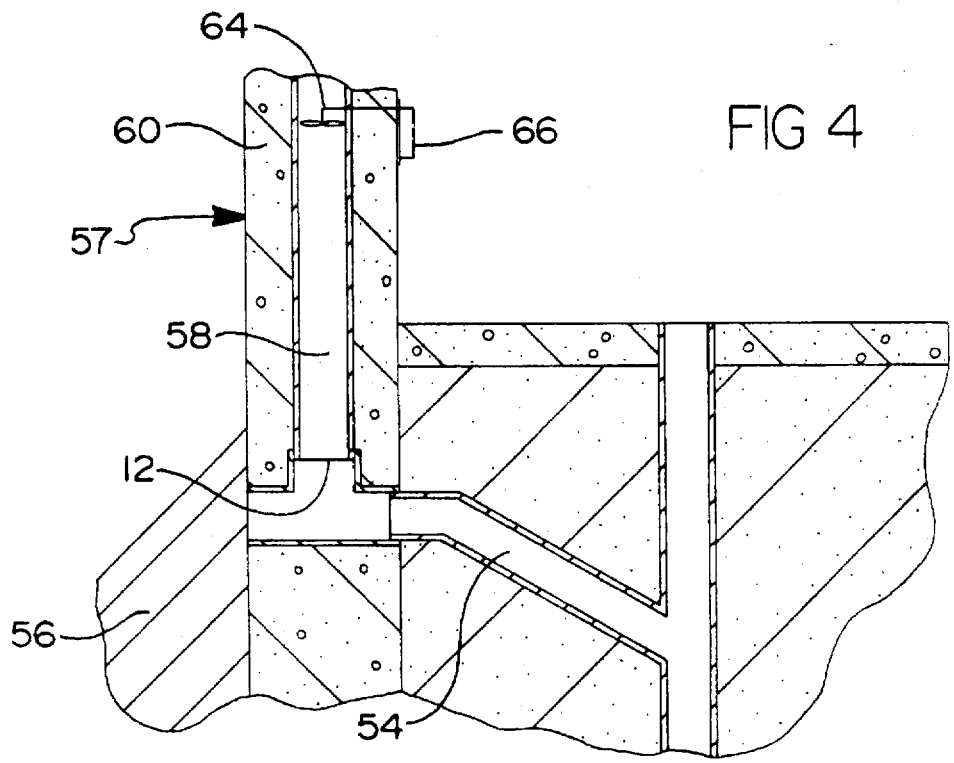
FIG. 4 is an environmental view of a drainage network using the connector of the present invention.

In FIG. 4 there is depicted a second aspect of the present invention, namely the preferred "T"-connector of the present invention in use. Herein, the end caps 30, 32 are removed from the outside of the form and the "T"-connector lies within the cement footing connecting a drain 54 with the ground 56 surrounding the outside of a building 57. Additionally, the first leg 12 is oriented in an upward direction and is connected to a length of corrugated tubing 58 which runs upwardly within the wall 60 of the basement of the building 57. The tubing 58 may extend to the roof of the building where gasses, such as radon and carbon monoxide, which emanate from the drain may exit the building. This prevents such gasses from becoming trapped within the building 57.

A fan 64 is located within the length of tubing 58. The fan is connected to a detection device 66 capable of detecting carbon monoxide, radon, natural gas and/or other dangerous gasses which may collect within the building. Such detectors are well known. If the detection device 66 detects any dangerous gas, the fan 64 is automatically started and the air within the building is evacuated through the tubing exiting at the roof and/or the opening in the footing. Where the gas is to be evacuated from the building may be predicated on the molecular weight of the gas, e.g. radon gas, which is lighter than air, would most likely be evacuated at the roof of the building. The fan 64 is connected to a power source, such as an electrical outlet or the like (not shown). The detector 66 functions as a switch, allowing electrical current to flow to the fan when radon, carbon monoxide, natural gas or another dangerous gas is detected.

It is to be appreciated that although only one length of tubing and one connector are pictured herein, a network of such tubing and connectors may be created using a plurality of fans connected to a plurality of detector devices. In this way, a large building may be automatically evacuated of unwanted gasses substantially immediately upon their detection. It is to be additionally appreciated that the evacuation points do not necessarily have to be located at only the roof and the footing of the building. For example, there may be evacuation points located at the sides of the building as well.

Figure 5:
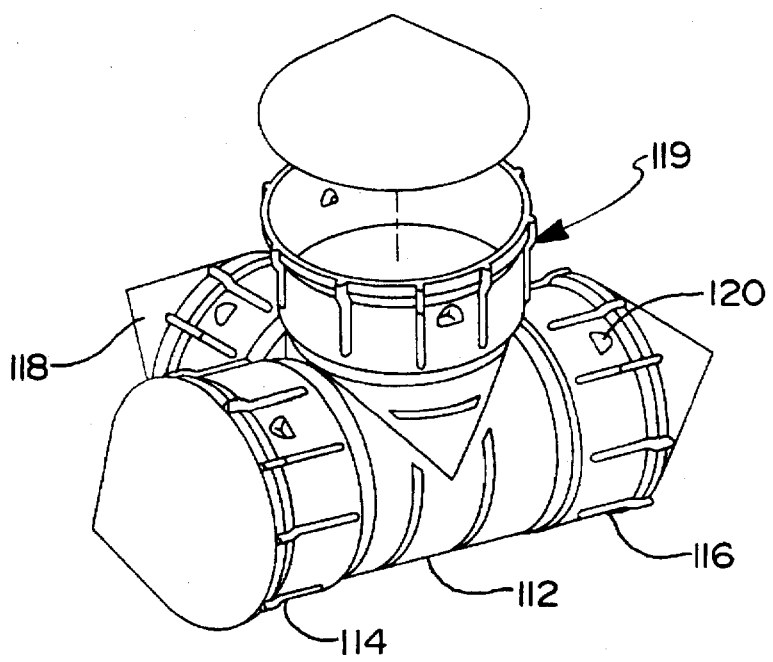
FIG. 5 is a view of an alternative embodiment of the connector of the present invention.

FIG. 5 depicts an alternative embodiment of the connector of the present invention. The connector hereof comprises a first leg 112 defined by arms 114, 116 which is oriented substantially normal to a second leg 118 and a third leg 119. The legs 112, 118, 119 have hollow interiors to enable fluid communication therebetween, as shown. The legs 112, 118 have protruberances 120 formed thereon to enable threaded engagement with a connecting section of conduit or a collar, as discussed hereinabove. This connector may be used in a footing network where an additional length of corrugated tubing is to be run from the connector to another area of the building.

The present invention provides a much improved connector and use thereof for several reasons. The present invention provides a connector that both drains water away from the outside of a building, and removes unwanted gasses from inside a building. Additionally, the connector of the present invention provides end caps for preventing the spillage of cement into the footing network.

While the invention has been illustrated and described in the drawings and the foregoing description, the same is to be considered illustrative and not restrictive in character, it being understood that only the preferred embodiment has been shown and described fully and that all changes and modifications that come within the spirit of the invention are desired to be protected.

Having, thus, described the invention, what is claimed is:

1. A connector for use with a collar and tubing in forming a fitting, the connector comprising:
    (a) at least a first hollow leg, the leg having a thread formed thereon, the leg being threadably connectable to a collar, and
    (b) at least one end cap integrally formed on and contiguous with the first hollow leg the at least one end cap projecting outwardly from the first hollow leg and being severable therefrom.

2. The connector of claim 1 further including at least one other hollow leg integral with the first leg and in fluid communication therewith.

3. The connector of claim 2 wherein the at least one other hollow leg is normal to the first hollow leg.

4. The connector of claim 1 wherein the first hollow leg has a first end and a second end, the at least one end cap integrally formed at an end thereof.

5. The connector of claim 4 wherein the at least one end cap comprises two end caps one at each end thereof.

6. The connector of claim 1 wherein the first leg has a thread formed thereon to enable threaded engagement with the collar.

7. The connector of claim 2 wherein the first leg is disposed substantially normal to the at least one other leg to define a T-shaped connector.

8. The connector of claim 2 wherein the first leg intersects the at least one other leg substantially normal thereto and ends therebeyond, the legs cooperating to define a cross-shaped connector.

9. The connector of claim 1 wherein the at least one end cap is configured to removably nest within a collar.

10. A drainage network for use within a building, the building having a footing and a roof, the network comprising:

the connector of claim 7, the connector being adapted to be disposed within the footing of a building such that the at least one other hollow leg is adapted to extend upwardly in the footing of the building and the first hallow leg is adapted to extend substantially horizontally through the footing of the building, and a length of tubing connected to and in fluid communication with the first end of the connector, the tubing, being adapted to extend upwardly through the building.

11. The drainage network of claim 10 wherein the length of tubing extends upwardly substantially to the roof of the building.

12. The drainage network of claim 11 wherein the length of tubing comprises at least one fan disposed within said tubing.

13. The drainage network of claim 12 further including at least one gas detector configured to detect the presence of a dangerous gas, means for connecting the detector and the fan; and the at least one fan being responsive to the detection of a dangerous gas by the at least one detector to exhaust the gas.

* * * * *